United States Patent [19]

Robinson et al.

[11] Patent Number: 4,529,505

[45] Date of Patent: Jul. 16, 1985

[54] INDIUM-CONTAINING CATALYST FOR REFORMING HYDROCARBONS

[75] Inventors: Delmar W. Robinson, Palatine; Russell W. Johnson, Villa Park; Mark D. Moser, Hoffman Estates, all of Ill.

[73] Assignee: UOP Inc., Des Plaines, Ill.

[21] Appl. No.: 640,473

[22] Filed: Aug. 13, 1984

Related U.S. Application Data

[62] Division of Ser. No. 500,520, Jun. 2, 1983, Pat. No. 4,487,848.

[51] Int. Cl.$^3$ .............................................. C10G 35/06
[52] U.S. Cl. ................................................... 208/139
[58] Field of Search ......................................... 208/139

[56] References Cited

U.S. PATENT DOCUMENTS

| | | | |
|---|---|---|---|
| 2,814,599 | 11/1957 | LeFrancois et al. | 502/328 |
| 3,745,112 | 7/1973 | Rausch | 208/139 |
| 3,892,657 | 7/1975 | Wilhelm | 208/139 |

FOREIGN PATENT DOCUMENTS 1499297 1/1978 United Kingdom .

*Primary Examiner*—D. E. Gantz
*Assistant Examiner*—Cynthia A. Prezlock
*Attorney, Agent, or Firm*—Thomas K. McBride; William H. Page, II

[57] ABSTRACT

A new catalyst for converting hydrocarbons, especially for reforming hydrocarbons, is disclosed. Also disclosed is a hydrocarbon conversion process using the catalyst as well as a method for making the catalyst. The catalyst comprises a platinum group component, a tin component, an indium component and a halogen component with a porous support material, wherein there is about 0.6 or more wt. %, on an elemental basis, indium present. In a preferred embodiment of the invention the catalyst is utilized in the catalytic reforming of hydrocarbons boiling in the gasoline range to produce a high octane reformate suitable for gasoline blending or a high aromatics content reformate suitable for use as a petrochemical feedstock.

5 Claims, No Drawings

INDIUM-CONTAINING CATALYST FOR REFORMING HYDROCARBONS

CROSS-REFERENCE TO RELATED APPLICATIONS

This application is a Division of my prior copending application, Ser. No. 500,520, filed June 2, 1983 and issued as U.S. Pat. No. 4,487,848 on Dec. 11, 1984, the content of which is hereby incorporated herein by reference thereto.

BACKGROUND OF THE INVENTION

1. Field of the Invention

This invention pertains to the conversion, especially reforming, of hydrocarbons in the presence of a catalyst composite. This invention also pertains to a new catalyst composition containing a platinum group component and a method for making the catalyst. Pertinent U.S. patent classifications for the subject matter of this invention include Class 208, Subclasses 64, 65, 133 and 143, and Class 252, Subclasses 461 and 466 PT—reforming of hydrocarbons with noble metal-containing catalysts.

The catalyst of this invention comprises a platinum group component, a tin component, an indium component and a halogen component with a porous support material. The catalyst comprises, on an elemental basis, about 0.6 or more wt. % indium. The catalyst is particularly useful in the catalytic reforming of hydrocarbons boiling in the gasoline range to produce in high yield a high octane reformate suitable for gasoline blending or a high aromatics content reformate suitable as a petrochemical feedstock.

2. Description of the Prior Art

Many components have been added to platinum group-containing compositions to obtain catalysts with improved performance. For example, U.S. Pat. No. 2,814,599 discloses adding primary activating agents selected from the group of gallium, indium, scandium, yttrium, lanthanum, thallium and actinium, and optional secondary activating agents selected from the group of mercury, zinc and cadmium, as well as optional promoting agents selected from the alcohols and ketones, to obtain a platinum and/or palladium catalyst with improved reforming activity.

U.S. Pat. No. 3,745,112 discloses that tin is a good promoter for platinum group-containing reforming catalysts. This patent discloses a reforming catalyst comprising platinum, tin and halogen.

U.S. Pat. No. 3,892,657 discloses that indium is a good promoter for platinum group-containing reforming catalysts when the atomic ratio of indium to platinum is less than 1.0. This patent discloses also that a Group IVA component selected from the group of germanium, tin, and lead can be added to the acidic form of the indium-containing catalysts for reforming applications. The acidic form of this catalyst, then, comprises a platinum group component, optionally a Group IVA component, an indium component, a halogen component and a porous carrier material wherein the atomic ratio of indium to platinum is less than 1.0. In column 4, lines 10-12, this patent discloses that only when the atomic ratio of indium to platinum is about 0.1 to 1.0 is the beneficial interaction of indium with platinum obtained. In column 25, lines 33-37, this patent discloses that when the atomic ratio is 1.35 or more, the beneficial effect of indium is not obtained. No catalyst comprising platinum and tin disclosed in this patent contains more than 0.5 wt. % indium.

British Pat. No. 1 499 297 discloses a dehydrogenation catalyst comprising platinum, at least one of the elements gallium, indium and thallium, and an alkali metal, especially lithium or potassium, with alumina as the carrier material. The disclosure of this patent is not limited to any specific atomic ratio of gallium or indium or thallium to platinum. The catalyst disclosed in this patent does not contain a tin component.

Surprisingly, we have discovered that when indium is added to a platinum- and tin-containing reforming catalyst, best yields of $C_5+$ liquid products are obtained when the catalyst comprises, on an elemental basis, about 0.6 or more wt. % indium. Furthermore, we have discovered that the beneficial effect of indium results from an interaction of indium with the porous support material, especially halogenated alumina, rather than from an interaction with the platinum group component as suggested by the prior art.

BRIEF SUMMARY OF THE INVENTION

This invention pertains to a new catalyst composition for converting hydrocarbons and to a process for converting hydrocarbons using the new catalyst. This invention also pertains to a method for making the new catalyst. The catalyst comprises a platinum group component, a tin component, an indium component and a halogen component with a porous support material. The catalyst comprises, on an elemental basis, about 0.6 or more wt. % indium. The catalyst is particularly useful for reforming hydrocarbons boiling in the gasoline range to produce in high yield a high octane reformate suitable for gasoline blending or a high aromatics content reformate suitable as a petrochemical feedstock. Addition of the indium component according to our invention provides a platinum group metal- and tin-containing reforming catalyst with improved selectivity characteristics as exhibited by increased $C_5+$ yields of constant octane reformate product.

DETAILED DESCRIPTION OF THE INVENTION

Heterogeneous catalysis practice, that is, catalyzing reactions of liquid or gaseous reactants with solid catalysts, is important to industry. For many years persons skilled in the art of hydrocarbon conversion, for example, have endeavored to discover and develop improved heterogeneous catalysts. Generally, these persons have been highly trained in one or more of a wide variety of disciplines, including, for example, organic and inorganic chemistry, solid state and surface physics, ceramics, metallurgy and chemical engineering. Notwithstanding this high level of skill in the art, hydrocarbon conversion with heterogeneous catalysts continues to be "a vast and confusing field replete with an enormous quantity of perhaps significant but empirical facts intermixed with perhaps useful theories." C. N. Satterfield, *Heterogeneous Catalysis in Practice*, preface (1980).

Consequently, significant contributions to the art of heterogeneous hydrocarbon conversion catalysis have generally resulted from empirical discoveries and developments rather than from theoretical extrapolations.

We have discovered a new catalyst comprising a platinum group component, a tin component, an indium component and a halogen component with a porous support material. The catalyst comprises, on an elemental basis, about 0.6 or more wt. % indium. Preferably the catalyst comprises, on an elemental basis, about 0.01 to about 5 wt. % platinum group component, about 0.01 to about 5 wt. % tin, about 0.06 to about 15 wt. % indium and about 0.01 to about 5 wt. % halogen component. The catalyst may also contain, on an elemental basis, about 0.01 to about 10 wt. % sulfur.

Optionally, the catalyst may also contain other, additional metals which act alone or in concert as catalyst modifiers to improve catalyst activity, selectivity or stability. For hydrocarbon conversion some well-known catalyst modifiers include antimony, arsenic, beryllium, bismuth, cadmium, calcium, chromium, cobalt, copper, germanium, gallium, gold, iron, lead, lithium, manganese, molybdenum, nickel, phosphorus, rhenium, scandium, silver, tantalum, thallium, titanium, tungsten, uranium, zinc and zirconium.

The catalyst of our invention is useful for the conversion of hydrocarbons, especially for the reforming of naphtha feedstocks boiling in the gasoline range. Typically these feedstocks will have an initial boiling point of from about 50° to about 150° F. and an end boiling point of from about 325° to about 425° F. Reforming reactions include dehydrogenation of naphthenes to aromatics, dehydrocyclization of paraffins to aromatics and hydrocracking and isomerization of naphthenes and paraffins, and the like reactions, to produce an octane-rich or aromatic-rich product stream. Reforming conditions include a temperature of about 500° to about 1100° F., a pressure of about 50 to 1000 psig, a liquid hourly space velocity (LHSV—equal to the liquid volume at standard temperature of the feedstock contacted with the catalyst per hour divided by the bulk volume of the catalyst particles) of about 0.1 to about 10 and a mole ratio of hydrogen to hydrocarbon of from about 0.5:1 to about 20:1.

Our invention, then, is a new catalyst composition comprising a platinum group component, a tin component, an indium component and a halogen component with a porous support material, wherein there is about 0.6 or more wt. % indium present, and the method of its manufacture. Also, our invention is the use of this new catalyst in a process for converting hydrocarbons, especially reforming hydrocarbons boiling in the gasoline range.

To be commercially successful a reforming catalyst must satisfy three essential requirements, namely, high activity, high selectivity and good stability. Activity is a measure of the catalyst's ability to help convert reactants into products at a specified severity level where severity level means the reaction conditions used, that is, the temperature, pressure, contact time and presence of diluents such as hydrogen, if any. For reforming catalyst activity we measured the reactor heater temperature in degrees Fahrenheit required to maintain a target research octane number of 102 for the reformate product. Selectivity is a measure of the catalyst's ability to help produce a high amount of desired product or products relative to the amount of reactants charged or converted. For catalyst selectivity we measured $C_5+$ yield, or the amount of hydrocarbons with 5 or more carbon atoms recovered, in liquid volume percent, relative to the total volume of the hydrocarbon charged. Stability means the rate of change with time of the activity and selectivity parameters—the smaller rate implying the more stable catalyst.

There is a considerable demand for new reforming catalysts with improved activity, selectivity or stability characteristics. The catalyst of our invention, that is, a catalyst comprising a platinum group component, a tin component, an indium component and a halogen component with a porous support material wherein there is about 0.6 or more wt. % indium present, will help answer such demands. Addition of the indium component according to our invention provides a platinum group metal- and tin-containing reforming catalyst with improved selectivity characteristics as exhibited by increased $C_5+$ yields of constant octane reformate product.

Regarding the platinum group component of our catalyst, it may be selected from the group of platinum or palladium or iridium or rhodium or osmium or ruthenium or mixtures thereof. Platinum, however, is the preferred platinum group component. We believe that substantially all of the platinum group component exists within the final catalyst composite in the elemental state. Preferably the platinum group component is well dispersed throughout the catalyst composite. The platinum group component can be used in any catalytically effective amount, good results being obtained with about 0.01 to about 5 wt. % platinum, for example, calculated on an elemental basis, of the final catalyst composite. Preferably the catalyst comprises about 0.4 wt. % platinum.

The platinum group component may be incorporated in the catalyst composite in any suitable manner such as by coprecipitation or cogelation or coextrusion, ion exchange or impregnation either before, while or after other catalytic components are incorporated. The particular method of incorporating the platinum group component is not deemed to be an essential feature of this invention. The preferred method of incorporating the platinum group component is to impregnate the support material with a solution or suspension of a decomposable compound of a platinum group metal. For example, platinum may be added to the support by commingling the latter with an aqueous solution of chloroplatinic acid. Hydrochloric acid or nitric acid or other optional components may be added to the impregnating solution to further assist in dispersing or fixing the platinum group component in the final catalyst composite.

Regarding the tin component of our catalyst, it is most likely present in an oxidation state above that of the elemental metal, that is, in the $+2$ or $+4$ oxidation state, either as a compound such as the oxide, for example, or combined with the support material or with the other catalyst components. Preferably, the tin component is also well dispersed throughout the catalyst. The tin component generally will comprise about 0.01 to about 5 wt. %, calculated on an elemental basis, of the final catalyst. Preferably the catalyst comprises about 0.3 wt. % tin.

The tin component may be incorporated into the catalytic composite in any suitable manner, including, for example, cogelation or coprecipitation with the support material, or ion exchange or impregnation of the support material with a suitable tin solution or suspension either before, while or after the other catalytic components are incorporated. A preferred method of incorporating the tin component is coprecipitating it during the preparation of the support material. For example, tin may be incorporated in an alumina support material by mixing a soluble tin compound such as stannous or stannic chloride with an alumina hydrosol, adding a gelling agent and dropping the mixture into an oil bath to form spheres containing alumina and tin.

Regarding the indium component of our catalyst, it also is preferably well dispersed throughout the composite in an oxidation state above that of the elemental metal. The indium component may be present as a compound such as the oxide, for example, or combined with the support material or with the other catalyst components. The indium component generally will comprise about 0.6 to about 15 wt. %, calculated on an elemental basis, of the final catalyst. Preferably the catalyst comprises about 0.6 wt. % indium.

The indium component may be incorporated into the catalytic composite in any suitable manner, including, for example, cogelation or coprecipitation with the support material, or ion exchange or impregnation of the support material with a suitable indium solution or suspension either before, while or after other catalyst components are incorporated. We have obtained good results both when the indium component has been incorporated by coprecipitating it during the preparation of an alumina support material from a mixture of an alumina hydrosol, a gelling agent and a soluble indium compound such as indium chloride or indium nitrate, for example, and by impregnating it on the prepared alumina support material from a solution of indium chloride, for example. We have obtained best results by impregnating an alumina support containing about 0.3 wt. % co-gelled tin with indium chloride, drying the composite and then impregnating it with chloroplatinic acid without an intermediate calcination step between the sequential indium and platinum impregnations. Also, we have obtained best results by impregnating an alumina support with indium chloride, drying the composite and then impregnating it with stannic chloride, drying the composite and then impregnating it with chloroplatinic acid without intermediate calcinations between the sequential indium, tin and platinum impregnations.

For our catalyst, there is about 0.6 or more wt. % indium present. In pilot plant tests reforming catalysts with about 0.6 or more wt. % indium present exhibited higher selectivity, represented by higher yields of $C_5+$ products, than similar catalyst with less indium present.

Regarding the halogen component of our catalyst, it may be either fluorine, chlorine, bromine or iodine or mixtures thereof. Chlorine and bromine are the preferred halogen components. The halogen component is generally present, we believe, in a combined state with the porous support material. Preferably the halogen component is also well dispersed throughout the catalyst composite. The halogen component generally will comprise about 0.01 to about 5 wt. %, on an elemental basis, of the final catalyst. Preferably the catalyst comprises about 1.0 wt. % chlorine.

The halogen component may be added to the support material in any suitable manner, either during the preparation of the support or before, while or after other catalyst components are incorporated. For example, the alumina hydrosol utilized to form the preferred alumina support material may contain halogen and thus contribute at least some portion of the halogen content in the final catalyst. Also, the halogen component or a portion thereof may be added to the catalyst during the incorporation of the support material with another catalyst component, for example, when using chloroplatinic acid to impregnate the platinum component. Also, the halogen component may be added to the catalyst by contacting the catalyst with the halogen or a compound, solution or suspension containing the halogen before or after other catalyst components have been incorporated with the support material. Suitable compounds containing the halogen include, for example, acids containing the halogen such as hydrochloric acid, and the like. Or, the halogen component may also be incorporated by contacting the catalyst with the halogen or a compound, solution or suspension containing the halogen in a subsequent catalyst regeneration step. In the regeneration step carbon deposited on the catalyst as coke during the use of the catalyst in the hydrocarbon conversion process is burned off the catalyst and the platinum group component which has become agglomerated on the catalyst is redistributed to provide a regenerated catalyst with performance characteristics much like the fresh catalyst. The halogen component may be added during the carbon burn step or during the platinum group component redistribution step, for example, by contacting the catalyst with chlorine gas or with hydrogen chloride gas. Also the halogen component may be added to the catalyst composite by adding the halogen or a compound, solution or suspension containing the halogen, such as propylene dichloride, for example, to the hydrocarbon feed stream or to the process recycle gas during operation of the hydrocarbon conversion process.

Regarding the porous support material of our catalyst composite, it is preferably a porous, absorptive support with high surface area of from about 25 to about 500 $m^2/g$. The porous support material should be relatively refractory to the conditions utilized in the reforming process. It is intended to include within the scope of our invention the use of support materials which have traditionally been utilized in hydrocarbon conversion catalysts such as, for example; (1) activated carbon, coke, or charcoal; (2) silica or silica gel, silicon carbide, clays, and silicates including those synthetically prepared and naturally occurring, which may or may not be acid treated, for example, attapulgus clay, china clay, diatomaceous, earth, fuller's earth, kaolin, kieselguhr, etc.; (3) ceramics, porcelain, crushed fire-brick, bauxite; (4) refractory inorganic oxides such as alumina, titanium dioxide, zirconium dioxide, chromium oxide, beryllium oxide, vanadium oxide, cesium oxide, hafnium oxide, zinc oxide, magnesia, boria, thoria, silica-alumina, silica-magnesia, chromia-alumina, alumina-boria, silica-zirconia, etc.; (5) crystalline zeolitic silicates such as naturally occuring or synthetically prepared mordenite, faujasite, silicalite or other zeolites, either in the hydrogen form or in a form which has been exchanged with metal cations; (6) spinels such as $MgAl_2O_4$, $FeAl_2O_4$, $ZnAl_2O_4$ and other like compounds having the formula $MOAl_2O_3$ where M is a metal having a valence of 2; and (7) combinations of materials from one or more of these groups. The preferred support material for our catalyst is alumina, especially gamma or eta alumina.

The preferred alumina support material may be prepared in any suitable manner from synthetically prepared or naturally occurring raw materials. The support may be formed in any desired shape such as spheres, pills, cakes, extrudates, powders, granules, etc., and it may be utilized in any particle size. One preferred shape of alumina is the sphere. Another preferred shape of alumina is the cylinder. A preferred particle size is about 1/16 inch in diameter, though particles as small as about 1/32 inch, and smaller, may also be utilized.

To make alumina spheres aluminum is converted into an alumina sol by dissolving aluminum with a suitable acid and water, and then dropping a mixture of the resulting sol and a gelling agent into an oil bath to form spherical particles of an alumina gel which are easily converted into the gamma-alumina support material by known methods including aging, drying and calcining. To make alumina cylinders, an alumina powder is mixed with water and a suitable peptizing agent such as nitric acid, for example, until an extrudable dough is formed. The dough is then extruded through a suitably sized die to form extrudate particles. Other shapes of the alumina support material may also be prepared by conventional methods. After the alumina particles are shaped generally they are dried and calcined. The alumina support material may be subjected to intermediate treatments during its preparation, including washing with water or contacting with ammonium hydroxide, for example, or with other compounds, which treatments are generally well-known in the art. Other catalyst components, including catalyst modifiers discussed above, may be added to the preferred alumina support material during or after its preparation.

Optionally the catalyst composite of our invention can also contain a sulfur component. Generally, the sulfur component will comprise about 0.01 to about 10 wt. %, preferably about 0.01 to about 1.5 wt. %, calculated on an elemental basis, of the final catalyst composite. The sulfur component may be incorporated into the catalytic composite in any suitable manner. Preferably sulfur or a sulfur-containing compound such as hydrogen sulfide, for example, is contacted with the catalyst in the presence of nitrogen at ambient temperature, preferably under water-free conditions, to incorporate the sulfur component after the catalyst has been reduced.

After the catalyst components have been combined with the porous support material, the catalyst generally will be dried at a temperature of about 200° to about 600° F. for a period of about 1 to about 24 hours or more, and then calcined or oxidized at a temperature of about 700° to about 1100° F. in an air or oxygen atmosphere for a period of about 0.5 to about 10 hours in order to convert substantially all of the catalytic components to the oxide form. The halogen content of the catalyst is best adjusted during the oxidation step by including a halogen or halogen-containing compound such as hydrochloric acid, for example, in the air or oxygen atmosphere utilized. In particular, when the halogen component of the catalyst is chlorine it is preferred to use a mole ratio of water to chlorine of about 5:1 to about 100:1 in air for about 1 to about 5 hours during the calcination step in order to adjust the final chlorine content of the catalyst to a range of about 0.1 to about 5 wt. %.

The calcined or oxidized catalyst composite is then preferably subjected to a reduction step prior to its first use in the conversion of hydrocarbons. This reduction step is designed to selectively reduce the platinum group component to the elemental state and to ensure a uniform dispersion of it on the support material. Preferably a substantially pure and dry hydrogen stream is used as the reducing agent in this step. The reducing agent is contacted with the catalyst at conditions including a temperature of about 400° to about 1200° F., a gas hourly space velocity (GHSV—equal to the gaseous volume at standard temperature and pressure of the treating stream contacted with the catalyst per hour divided by the bulk volume of the catalyst particles) of about 10 to 10,000, sufficient to rapidly dissipate any local concentrations of water formed during the reduction step, for about 0.5 to 10 hours, effective to reduce substantially all of the platinum group component to the elemental state.

According to the process of this invention the hydrocarbon feedstock is contacted with the catalyst of this invention in a hydrocarbon conversion zone. This contacting may be accomplished with the catalyst being in a fixed, moving, ebullated or fluidized type catalyst bed, either in a continuous or a batch type operation, with either continuous or batch type regenerations of the catalyst between operational cycles. The hydrocarbon conversion zone may be one or more separate reactors, and the hydrocarbons may be contacted with the catalyst bed in an upward, downward or radial flow type fashion. The hydrocarbons may be in either the liquid, mixed liquid-vapor or vapor phase when they contact the catalyst.

The catalyst composition of this invention is best used for reforming hydrocarbons boiling in the gasoline range.

For reforming operations where the reactions of dehydrogenation, dehydrocyclization, hydrocracking and isomerization occur simultaneously to varying extents, the preferred catalyst composition of this invention comprises, on an elemental basis, about 0.01 to about 5 wt. % platinum group component, about 0.01 to about 5 wt. % tin, about 0.6 to about 15 wt. % indium and about 0.01 to about 5 wt. % chlorine on alumina. Best results have been obtained with a catalyst comprising 0.4 wt. % platinum, about 0.3 wt. % tin, 0.6 wt. % indium and 1.0 wt. % chlorine on gamma-alumina of 0.5 g/ml apparent bulk density (ABD—equal to the weight of the alumina particles in a full container divided by the volume of the container). In a reforming process the hydrocarbon and hydrogen are contacted with the catalyst in a reforming zone at a temperature of about 775° to about 1100° F., a pressure of about 0 to about 1000 psig, an LHSV of about 0.1 to about 10 hr.$^{-1}$, and a mole ratio of hydrogen to hydrocarbon of about 0.5:1 to about 20:1. Preferably the pressure is about 50 to about 450 psig. For reforming operations it is generally preferred to maintain the reforming zone substantially water-free, that is, with less than 20 ppm, and preferably less than 5 ppm, calculated as weight of water in the feedstock, entering the reforming zone from any source. The reforming zone may be one or more separate rectors with suitable heat exchange means therebetween to maintain the desired temperature at the inlet to each reactor. The effluent stream from the reforming zone is generally passed through a cooling means to a separation zone, typically maintained at about 25° to 150° F., wherein a hydrogen-rich gas stream is separated from the high octane or high aromatics content liquid product stream, commonly called an unstabilized reformate. The separated hydrogen stream may be recycled back to the reforming zone or utilized in other refinery processes, or both. The unstabilized reformate is typically passed to a fractionation zone wherein a stabilized reformate is recovered as the product of the reforming process.

The hydrocarbon charged to the reforming zone will comprise hydrocarbons, including naphthenes and paraffins, boiling in the gasoline range. Suitable feedstocks include staight run or natural gasolines, thermally or catalytically cracked gasolines, synthetic gasolines, partially reformed gasolines, and the like. The hydrocarbon feedstock may be a full boiling gasoline having an initial boiling point of from about 50° to about 150° F. and an end boiling point of from about 325° to about 425° F. The feedstock may be pure hydrocarbons or mixtures thereof. Also, the chargestock may be pretreated by conventional methods such as by hydrotreating, including hydrodesulfurization and the like, to remove substantially all sulfurous, nitrogenous, and other contaminants therefrom or to saturate any olefins therein.

The catalyst of this invention may be utilized for catalyzing many reactions besides the reforming reactions discussed above, including alkylation, de-alkylation, trans-alkylation, cracking, cyclization, denitrogenation, desulfurization, hydrogenation, hydrogenolysis and polymerization reactions.

The following worked Examples are introduced to describe further the catalyst of our invention, and to teach one skilled in the art how to make it and how to use it in the hydrocarbon conversion process of our invention. These Examples represent some specific embodiments of our invention, and are intended to be illustrative only and not restrictive.

EXAMPLE I

A platinum- and tin-containing reference catalyst was prepared. It comprised about 0.4 wt. % platinum, about 0.3 wt. % tin and about 1.0 wt. % chlorine on a support of gamma alumina. The catalyst was prepared by dissolving aluminum pellets in a hydrochloric acid solution, then dissolving in this sol an amount of stannic chloride calculated to provide a final catalyst containing about 0.3 wt. % tin, and then adding hexamethylenetetramine. Then this mixture was dropped into an oil bath to form spherical particles having an average particle diameter of about 1/16 inch. Then the spheres were aged in the oil bath, washed with an ammoniacal solution, dried and calcined in air to make a support of gamma-alumina containing about 0.3 wt. % tin in the form of tin oxide. The tin-containing alumina support was then contacted for about 1 hour at about 70° F. with an aqueous impregnating solution containing an amount of chloroplatinic acid calculated to provide a final catalyst containing about 0.4 wt. % platinum. An amount of hydrochloric acid equal to about 2 wt. % of the alumina support was added to the platinum impregnation solution to ensure a uniform dispersion of the platinum throughout the support. Then the catalyst was dried in air for about 2.5 hours at 225° F. and oxidized in a 500 hr.$^{-1}$ GHSV dry air stream for about 0.5 hour at about 975° F. Then the catalyst was chloride treated for about 2 hours at 975° F. with a 500 hr.$^{-1}$ GHSV sulfur-free air stream containing water and hydrochloric acid in a mole ratio of about 30:1 to adjust the chlorine content of the catalyst to about 1.0 wt. %. Then the catalyst was reoxidized in the dry air stream and finally reduced for about 1 hour at 1050° F. with a 400 hr.$^{-1}$ GHSV hydrogen stream containing less than 5 volume ppm of water.

EXAMPLE II

Four platinum-, tin- and indium-containing catalysts were prepared. These catalysts were prepared in the same manner as the reference catalyst in EXAMPLE I above, except different amounts of indium in the form of indium chloride were also added to the platinum impregnation solution for these four catalysts:
Catalyst A comprised 0.2 wt. % indium;
Catalyst B comprised 0.3 wt. % indium;
Catalyst C comprised 0.6 wt. % indium; and
Catalyst D comprised 1.0 wt. % indium.

EXAMPLE III

The reference catalyst and catalysts A, B, C and D were then separately tested for reforming a naphtha fraction boiling in the gasoline range. These tests were each performed at identical conditions which included an inlet reactor temperature which was continuously adjusted throughout the test in order to achieve and maintain a target $C_5+$ reformate product research octane number of 102, a pressure of 75 psig, a LHSV of 2.0 hr.$^{-1}$ and a 5:1 hydrogen to hydrocarbon mole ratio. All tests were performed in a pilot-plant-scale reforming unit comprising a reactor containing a fixed catalyst bed, a hydrogen separation zone, a debutanizer column and suitable heating and condensing means, pumping and compressing means and the like conventional pilot plant equipment. In this plant a hydrogen recycle stream is commingled with the naphtha chargestock and the resulting mixture is heated to the desired conversion temperature. The heated mixture is passed downflow through the reactor containing the catalyst undergoing evaluation. An effluent stream is withdrawn from the bottom of the reactor, cooled to about 55° F. and passed to a hydrogen separation zone wherein a hydrogen-rich gaseous phase is separated from a hydrocarbon-rich liquid phase. A portion of the gaseous phase is continuously passed through a high surface area sodium scrubber and the resulting substantially sulfur-free and water-free hydrogen stream is returned to the reactor as the hydrogen recycle stream. Excess gaseous phase from the hydrogen separation zone is recovered as a hydrogen-rich product stream. The liquid phase from the separation zone is passed to a debutanizer column wherein light gaseous products, including $C_1$ to $C_4$ hydrocarbons, are taken overhead as debutanizer gas and $C_5+$ hydrocarbons are withdrawn from the debutanizer bottoms as the high octane or high aromatics content reformate product.

The results of the separate tests performed on the reference catalyst and catalysts A, B, C and D are presented in TABLE I.

TABLE I

|  | Reference Catalyst | Catalyst A | Catalyst B | Catalyst C | Catalyst D |
|---|---|---|---|---|---|
| Wt. % In | 0 | 0.2 | 0.3 | 0.6 | 1.0 |
| Wt. % Pt | 0.4 | 0.4 | 0.4 | 0.4 | 0.4 |
| Ave. $C_5+$ Yield (LV %) | 78.52 | 79.02 | 79.30 | 79.75 | 79.43 |
| Yield Advantage Relative to Reference Catalyst (LV %) | — | 0.54 | 0.78 | 1.23 | 0.91 |

From TABLE I it is apparent that catalysts C and D with indium amounts within our claimed range exhibit the highest selectivity, represented by their higher yield advantage relative to the reference catalyst, than the other catalysts. So, it is clear that a catalyst according to our invention, that is, a catalyst comprising a platinum group component, a tin component, an indium component and a halogen component with a porous support material, wherein there is about 0.6 or more wt. % indium present, provides a selective catalyst for reforming hydrocarbons.

We claim as our invention:

1. A process for reforming hydrocarbons which comprises contacting the hydrocarbons at reforming conditions with a catalyst comprising a platinum group component, a tin component, an indium component and a halogen component with a porous support material, wherein there is about 0.6 or more wt. %, on an elemental basis, indium present.

2. The process of claim 1 wherein the catalyst comprises, on an elemental basis, about 0.01 to 5 wt. % platinum group component, about 0.01 to 5 wt. % tin, about 0.6 to 15 wt. % indium and about 0.01 to 5 wt. % halogen component.

3. The process of claim 1 wherein the catalyst also comprises, on an elemental basis, about 0.01 to 10 wt. % sulfur.

4. The process of claim 1 wherein the hydrocarbons are hydrocarbons boiling in the gasoline range.

5. The process of claim 1 wherein the reforming conditions include a pressure of about 50 to about 450 psig.

* * * * *